Jan. 3, 1933.  H. AUSTIN  1,893,349
MOTOR VEHICLE BODY HAVING COLLAPSIBLE HEAD
Filed July 29, 1930  3 Sheets-Sheet 1

Inventor
Herbert Austin
By Pennie, Davis, Marvin & Edmonds
Attorneys

Jan. 3, 1933.   H. AUSTIN   1,893,349
MOTOR VEHICLE BODY HAVING COLLAPSIBLE HEAD
Filed July 29, 1930    3 Sheets-Sheet 3

Inventor:
Herbert Austin
By
Pennie, Davis, Marvin & Edmonds
Attorneys

Patented Jan. 3, 1933

1,893,349

UNITED STATES PATENT OFFICE

HERBERT AUSTIN, OF BROMSGROVE, ENGLAND

MOTOR VEHICLE BODY HAVING COLLAPSIBLE HEAD

Application filed July 29, 1930, Serial No. 471,463, and in Great Britain August 3, 1929.

This invention relates to a motor vehicle body of the type having what is known as a "sunshine roof" that is to say a flexible roof in the form of a cover usually of fabric which is folded back leaving fixed cant rails at each side extending over the doors and windows and extending also down at the rear to a fixed lower portion of the back of the vehicle. In such type of vehicle, hoop sticks or transverse roof members have been attached to the inner surface of the flexible cover and have been arranged to slide in guides of the cant rails, the arrangement having been such that alternate transverse members are guided in guides for the whole of the way back and down to the top of the fixed part of the back of the vehicle while the rest of the transverse members have come free from such guides when they have reached the rear of the top of the vehicle, so that the cover may go into suitable folds. Links have been arranged between the transverse members at each side of the vehicle, the links having been hinged to fittings at the ends of the transverse members, said links serving as struts to move the said members back, it being usual to operate the cover from the front transverse member.

Although the links serve to move the transverse roof members back, they must not take the end strain when the flexible cover is in its fully forward position as this would prevent the proper stretching of the material. To this end the links have been formed as flexible strips housed in channels or grooves and being arranged so that they sag somewhat between the roof members, so that they cannot take tension strain, though, by their confinement in the grooves, they can be utilized to take the compression strain needed to move back the roof fabric. These strips are not, however, satisfactory in taking compression strain as they bear unduly on the sides of the grooves, preventing the roof from running back freely, and the present invention has for its object to provide improved means for use in moving the roof back and which will not interfere with the proper stretching of the roof.

According to this invention the roof fabric is moved back through the agency of wire coils, the convolutions of which, preferably by touching each other, can transmit compression strain but will yield to tension strain to permit of the stretching of the fabric.

The invention is described with reference to the drawings herewith, of which:—

Referring first to Figures 1 to 5, A represents the cant rail, B the transverse roof members, and C the roof fabric. D is a rigid rear portion of the vehicle body hinged to the lower portion thereof at $d$. Each transverse member B has secured to it at each end, an upper plate $b$ (see Figure 4) bent down at its outer end $b'$ and a lower plate $a$ bent up at its end $a'$. The two plates are secured to the members B by a pin $e$ and their bent ends $a'$ $b'$ support between them two pins $f$ which form the pivots for the ends of links F.

Each link F comprises two end lugs $f'$ (see especially Figure 5), each with an externally screwed shank $f^2$ on to each of which is screwed the end of a coil spring $f^3$, the convolutions of which grip tightly on the threads. It will be understood that the tendency of screwing up is to ease the convolutions from the threads, whereas any tendency to unscrew causes the convolutions to grip more tightly.

Some of the links are supported inside by cores G each in one piece with one of the lugs $f'$ to keep the links from flexing while others are left free to do so. For instance, those without cores may alternate with those which have cores; but it is found expedient in some cases to provide both the links at the rear end on each side with the cores G.

Figure 1:
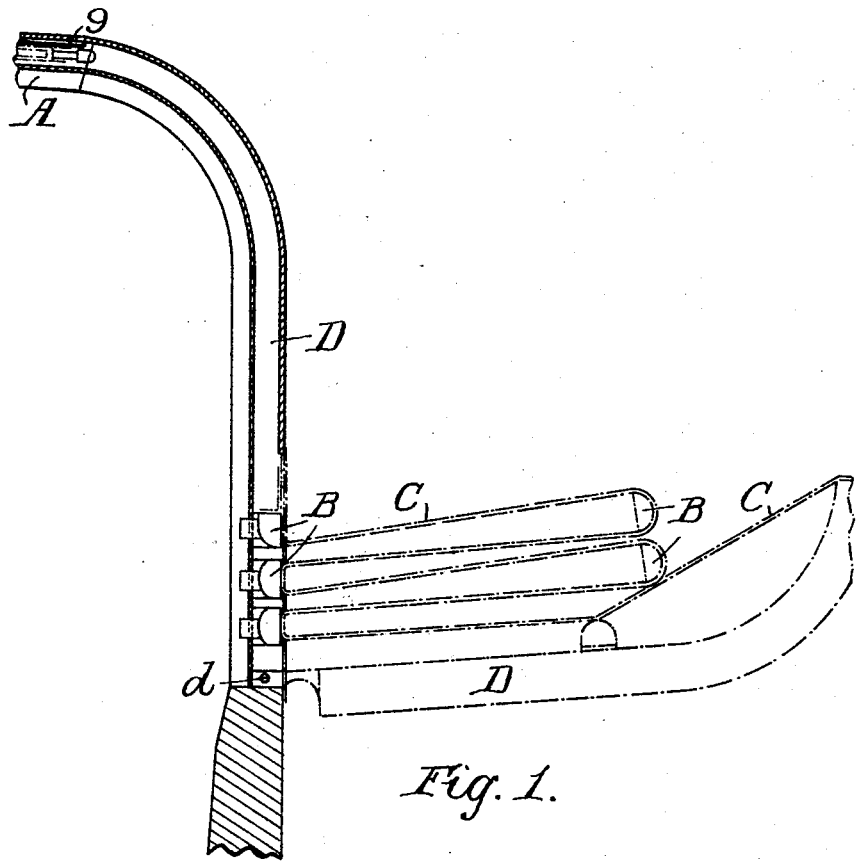
Figure 1 is a longitudinal section in somewhat diagrammatic form of a portion of a vehicle body of the "sunshine roof" type, and having links arranged according to this invention.
Figure 1A:
Figure 1a is a view of the front end of the roof of the vehicle shown in Figure 1.
Figure 2:
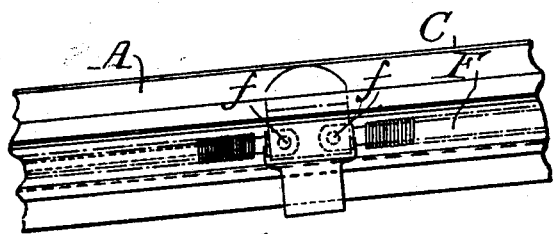
Figures 2 and 3 are two inner face elevations to an enlarged scale of portions of the cant rail shown in Figure 1.
Figure 6:
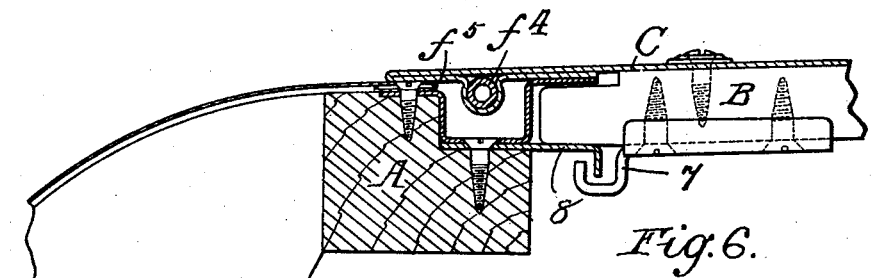
Figure 6 is a transverse sectional view of a cant rail to illustrate the application to a modification in which a continuous coil spring extends along each side of the roof fabric and is attached to the under surface thereof.

In the embodiment shown in Figure 6, the links at each side are replaced by a continuous coil spring $f^4$, extending the whole length of the fabric and being enclosed in a fabric sheath $f^5$ stitched to the underside of the fabric C. The coil spring $f^4$ is attached directly to the front transverse member B; but although attached to the fabric it is not connected directly to the rest of the transverse members B, but the latter also are, of course, attached to the fabric. When the roof fabric is folded back the coil springs form into loops conforming with the pleating of the fabric.

Figure 4:
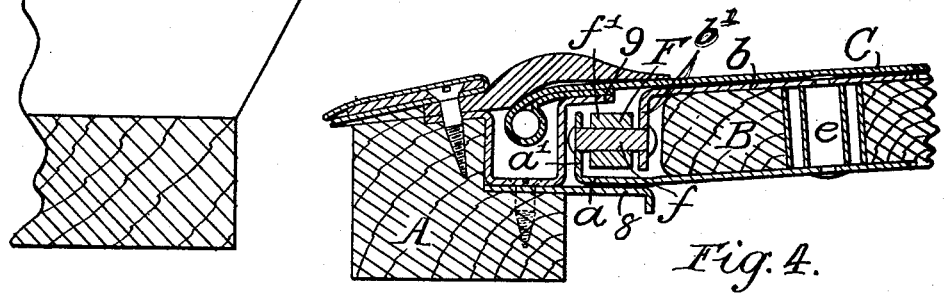
Figure 4 is a transverse sectional view of a cant rail.
Figure 3:
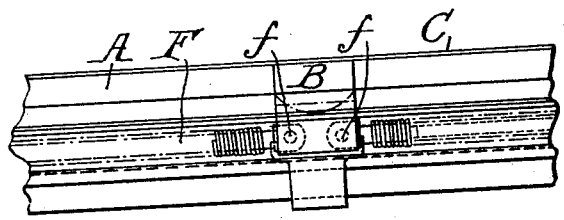
Figure 5:
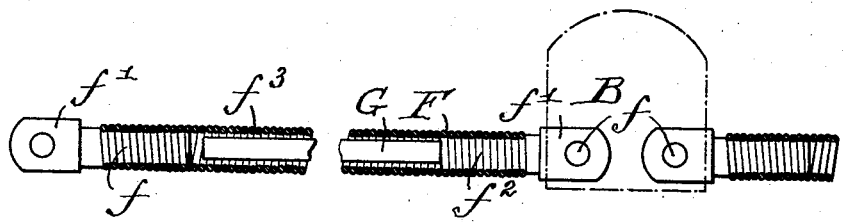
Figure 5 is a view to illustrate two forms of links, the coils in each case being shown in section.
Figure 7:
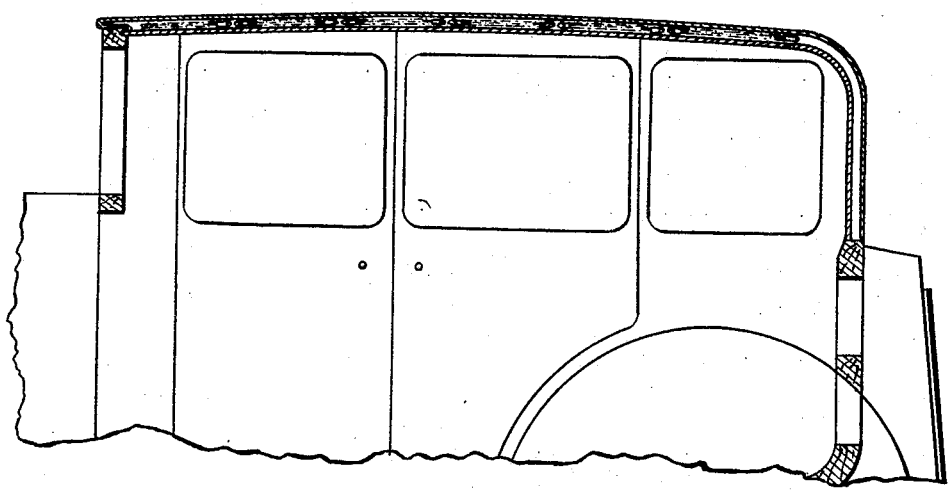
Fig. 7 is a longitudinal view of the vehicle body, showing the roof in its closed position.
Figure 8:
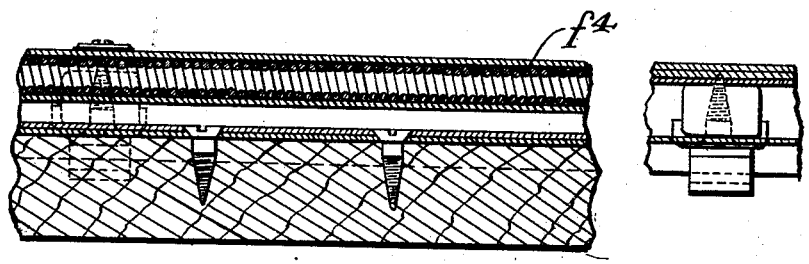
Fig. 8 is a broken longitudinal section on an enlarged scale of the cant rail and continuous coil spring shown in Fig. 6.

In both the above modifications alternate roof members B are provided with plates 7 which project under an inwardly projecting flange 8 secured to the cant rail A as for instance is shown in Figure 6. This plate keeps these alternate roof members constantly in engagement with the cant rail. The other transverse roof members, however, are without the plate 7 as for instance is shown in Figure 4 so that they are free to move away from the cant rail when they reach the rear of the roof. Until they come to such position they are kept in engagement by a flange 9 which projects over the ends of the transverse members, but such flange 9 is discontinued at the rear end of the vehicle, that is to say it does not pass down the back. For this reason the cover can pleat up at the rear as shown by broken lines in Figure 1.

Having fully described my invention what I claim and desire to secure by Letters Patent is:—

1. A vehicle body roof comprising fixed longitudinal cant rails extending at each side over the doors and windows and extending also down at the rear to a fixed lower portion of the back of the vehicle, a flexible cover for the roof, transverse roof members attached to the under surface of said cover and wire coils also attached to the underface of said cover and extending along under said cover near each side edge thereof the convolutions of the coils normally touching each other so that the coils can be utilized to sustain a push but will yield somewhat in tension and said coils serving as means whereby said cover and said transverse members are moved back by the movement back of one of said transverse members which is forwards of the others.

2. A vehicle body roof comprising fixed longitudinal cant rails extending at each side over the doors and windows and extending also down at the rear to a fixed lower portion of the back of the vehicle, a flexible cover for the roof, transverse roof members attached to the under surface of said cover and links each constituted mainly as a wire coil also attached to the under surface of said cover and extending along under said cover near each side edge thereof the convolutions of the coils normally touching each other so that the coils can be utilized to sustain a push, but will yield somewhat in tension and said coils serving as means whereby said cover and said transverse members are moved back by the movement back of one of said transverse members which is forwards of the others.

3. A vehicle body roof comprising fixed longitudinal cant rails extending at each side over the doors and windows and extending also down at the rear to a fixed lower portion of the back of the vehicle, a flexible cover for the roof, transverse roof members attached to the under surface of said cover, and links pivoted to said transverse roof members near the ends thereof and said links constituted mainly as wire coils the convolutions of the coils normally touching each other so that the coils can be utilized to sustain a push, but will yield somewhat in tension and said coils extending along under said cover and serving as means whereby said cover and said transverse members are moved back by the movement back of one of said transverse members which is forwards of the others.

4. A vehicle body roof comprising fixed longitudinal cant rails extending at each side over the doors and windows and extending also down at the rear to a fixed lower portion of the back of the vehicle, a flexible cover for the roof, transverse roof members attached to the under surface of said cover, links pivoted to said transverse roof members near the ends thereof and said links constituted mainly as wire coils the convolutions of the coils normally touching each other so that the coils can be utilized to sustain a push, but will yield somewhat in tension and said coils extending along under said cover and serving as means whereby said cover and said transverse members are moved back by the movement back of one of said transverse members which is forwards of the others, and rigid cores within the wire coils of said links to render them inflexible to withstand substantially rigidly, excessive and sudden pushes thereon.

5. A vehicle body roof comprising fixed longitudinal cant rails extending at each side over the doors and windows and extending also down at the rear to a fixed lower portion of the back of the vehicle, a flexible cover for the roof, transverse roof members attached to the under surface of said cover, and links pivoted to said transverse roof members near the ends thereof and said links constituted mainly as wire coils the convolutions of the coils normally touching each other so that the coils can be utilized to sustain a push, but will yield somewhat in tension and said coils extending along under said cover and serving as means whereby said cover and said transverse members are moved back by the movement back of one of said transverse members which is forwards of the others, and each said link comprising two end lugs each adapted for pivotal connection to one of the transverse roof members and each having a screwed shank upon which the end of the respective wire coil is engaged.

6. A vehicle body roof comprising fixed longitudinal cant rails extending at each side over the doors and windows and extending also down at the rear to a fixed lower portion of the back of the vehicle, a flexible cover for the roof, transverse roof members attached to the under surface of said cover, links pivoted to said transverse roof members near the ends thereof and said links constituted mainly as wire coils the convolutions of the coils normally touching each other so that the coils can be utilized to sustain a push, but will yield somewhat in tension and said coils extending along under said cover and serving as means whereby said cover and said transverse members are moved back by the movement back of one of said transverse members which is forwards of the others, and each said link comprising two end lugs each adapted for pivotal connection to one of the transverse roof members and each having a screwed shank upon which the end of the respective wire coil is engaged and a rigid core within the wire coil of each link said core being formed as an extension of one of the end lugs.

In witness whereof I have hereunto signed my name this 17th day of July, 1930.

HERBERT AUSTIN.